(12) United States Patent
Straatmans

(10) Patent No.: US 7,320,210 B2
(45) Date of Patent: Jan. 22, 2008

(54) SAFETY AND HARVESTING DEVICE

(75) Inventor: Tim Straatmans, Boyne Island (AU)

(73) Assignee: Straatmans Holding Company Pty Ltd, Queensland (AU)

(*) Notice: Subject to any disclaimer, the term of this patent is extended or adjusted under 35 U.S.C. 154(b) by 0 days.

(21) Appl. No.: 11/178,124

(22) Filed: Jul. 8, 2005

(65) Prior Publication Data

US 2006/0037300 A1    Feb. 23, 2006

Related U.S. Application Data

(63) Continuation-in-part of application No. 10/471,212, filed on Sep. 8, 2003, which is a continuation-in-part of application No. PCT/AU02/00282, filed on Mar. 13, 2002, now abandoned.

(51) Int. Cl.
    *A01D 46/22*    (2006.01)
(52) U.S. Cl. .................................. 56/329
(58) Field of Classification Search ............. 56/328.1, 56/329, 339, 340.1
    See application file for complete search history.

(56) References Cited

U.S. PATENT DOCUMENTS

| | | | | |
|---|---|---|---|---|
| 138,565 A | * | 5/1873 | Kelsey | ................... 56/329 |
| 155,560 A | | 9/1874 | Wingard | |
| 356,451 A | | 1/1887 | Cook | |
| 395,947 A | * | 1/1889 | Bradley | ................... 56/329 |
| 606,682 A | | 7/1898 | Pearce et al. | |
| 853,833 A | | 5/1907 | Saum, Jr. | |
| 1,256,890 A | | 2/1918 | Flinn | |
| 1,286,947 A | * | 12/1918 | Creed | ................... 56/329 |
| 1,286,980 A | | 12/1918 | Fleckner | |
| 1,312,967 A | | 8/1919 | Ferry | |
| 1,536,167 A | * | 5/1925 | Totten | ................... 56/329 |
| 1,974,572 A | | 9/1934 | Laflin | |
| 2,519,678 A | * | 8/1950 | Mackenzie | ................... 56/329 |
| 2,649,680 A | | 8/1953 | Brown | |
| 4,901,513 A | | 2/1990 | Kim et al. | |
| 5,189,871 A | | 3/1993 | Frederiksen et al. | |
| 5,191,758 A | | 3/1993 | Cote | |

FOREIGN PATENT DOCUMENTS

| | | |
|---|---|---|
| DE | 2402318 A1 | 7/1975 |
| DE | 10105524 A1 | 1/2002 |
| FR | 2 431 245 A | 2/1980 |
| GB | 2338636 A | 12/1999 |
| RU | 2134950 C1 * | 8/1999 |

* cited by examiner

Primary Examiner—Thomas B. Will
Assistant Examiner—Alicia Torres
(74) Attorney, Agent, or Firm—Alston & Bird LLP

(57) ABSTRACT

The present invention relates to a device for use with a fruit-bearing tree, the device being adapted to be mounted to a tree trunk and when mounted the device includes;

a catching means which in use has an upper perimeter and an aperture through which a tree trunk passes;

a support means having a collar attachable around the tree trunk, a support ring and at least two support members, wherein the support ring is mounted to the catching means at a location spaced inwardly from the upper perimeter, the collar is located above the catching means and the support members extend between the collar and the support ring.

12 Claims, 8 Drawing Sheets

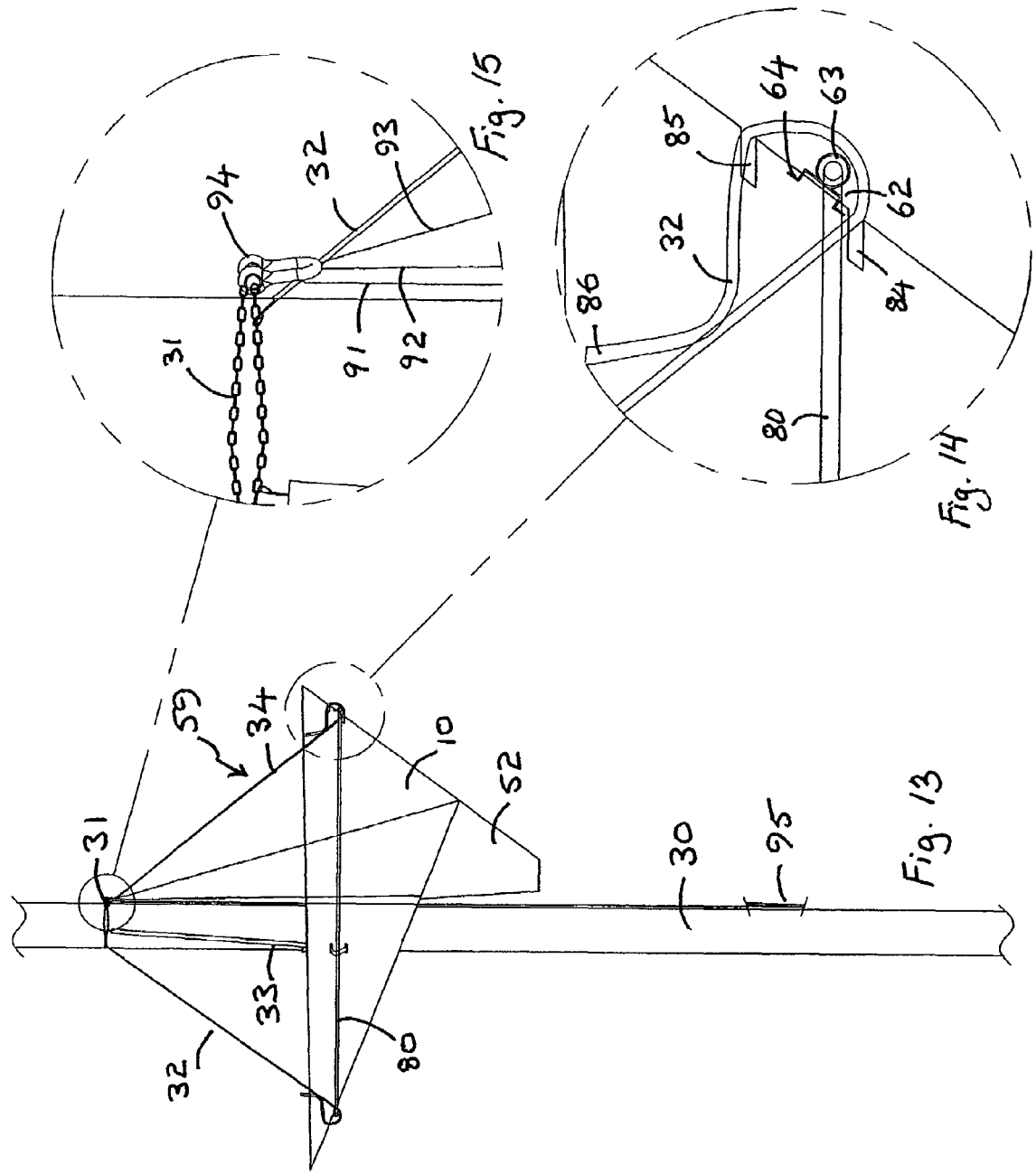

SAFETY AND HARVESTING DEVICE

CROSS-RELATED APPLICATIONS

This application is a Continuation-In-Part Application of U.S. Ser. No. 10/471,212 filed 8 Sep. 2003 now abandoned, which is a U.S. National Phase Application of PCT International Application No. PCT/AU02/00282, filed Mar. 13, 2002, claiming priority from Australian Patent No. PR3706, filed Mar. 13, 2001.

FIELD OF THE INVENTION

The present invention relates to a safety and harvesting device. More particularly the invention relates to a safety and/or harvesting device for use with fruit bearing trees.

The present invention will be described with reference to coconut palms. However, it will be appreciated that the device of the present invention may be used with any suitable tree and no limitation is intended thereby.

In the present specification and claims, the term fruit will be understood to refer to any fruiting body or part thereof of a tree and includes seeds, seedpods and nuts.

BACKGROUND OF THE INVENTION

Falling fruit from trees such as coconut, breadfruit and jackfruit trees can pose a danger to people in the vicinity of the tree. People have been injured and in some cases killed by falling coconuts. Property such as cars may also be damaged by falling fruit. Measures which have been employed to minimize the risks associated with such trees includes simple warning signs alerting people to the dangers, removing fruit when green before it ripens and falls and even removing the offending trees. Fruit removal is a manually intensive and costly procedure. Further, green fruit may still become dislodged under conditions such as high wind or be loosened or dislodged by animals feeding on the fruit. Whilst tree removal is a final solution in many cases it is neither environmentally, culturally, nor aesthetically desirable.

Other types of trees drop fruit, nuts, seeds and the like, which although may not pose a safety threat, the falling of such bodies may be undesirable. For example, the dropping of fruit, seeds or the like onto areas such as lawns, golf greens, swimming pools and the like is undesirable for many reasons. Currently, when trees are fruiting and dropping fruit, the dropped fruit must be manually cleared from the area. Such clearing is typically manually intensive and can add to maintenance costs.

Harvesting of fruit from trees may also be an energy intensive process. Harvesting of coconuts for example is still carried out by traditional methods. The simplest method is to wait for the coconuts to fall on the ground and manually pick them up. A disadvantage of collecting coconuts from the ground is that it is manually intensive. Further, whilst on the ground coconuts are susceptible to damage by animals and rodents in particular. Alternatively and/or in addition to, trained climbers climb the trees to pick the coconuts. In some Asian countries specially trained monkeys are used for this purpose. Seed collection is another area where collectors wait for seeds to fall onto the ground and/or climb trees to collect the seeds. Again this is a manually intensive process. Further, climbing trees is an inherently risky procedure.

Various types of fruit collecting or harvesting devices have been proposed over the years. Some of these devices include a fruit catching apron or the like which extends radially from the trunk of the tree. In many cases, these earlier devices include quite complicated attachment and support means in the form of rigid support arms. Some earlier devices represent inverted umbrellas. Some of these devices include complicated means for guiding the fruit from a catching are to a collection area. These earlier devices generally include numerous parts, are expensive to manufacture and complicated and time consuming to install. Further, in view of the complicated nature of the devices and moving parts therein, regular maintenance is required. Further such devices are subject to damage by the weight of the falling fruit themselves and under adverse weather conditions. Further, it is believed that many of these earlier devices were developed based on the assumption that trees grow vertically and trunks have a circular cross-section. In practice this is not always the case and the present inventor is unaware of any such devices being in commercial use today.

It is therefore an object of the present invention to provide a device for collecting vegetation falling from a tree, which may at least partially overcome the above disadvantages or provide the public with a useful or commercial choice.

SUMMARY OF THE INVENTION

According to a broad form of the invention there is provided a device for use with a fruit-bearing tree, the device being adapted to be mounted to a tree trunk and when mounted the device includes;

a catching means which in use has an upper perimeter and an aperture through which a tree trunk passes;

a support means having a collar attachable around the tree trunk and at least two support members, wherein the collar is located above the catching means and the support members extend between the collar and the support ring.

The catching means may be of any suitable size, shape and construction. It will be appreciated by persons skilled in the art that these parameters may be varied depending upon the type of tree, the type of fruit and the like. Typically, the catching means when mounted about the trunk of a tree, encircles the tree.

The catching means may be formed from any suitable material. A particularly preferred material is a thermoplastics material such as polyethylene or polypropylene. Such materials combine a degree of flexibility which assists when the device to the tree, whilst at the same time having sufficient rigidity to present a taut surface to a falling piece of fruit. Preferably, the thermoplastic is moulded in the form of a net or grid. This assist in minimizing or alleviating wind resistance.

When the device is mounted to a tree, the catching means defines a catching zone beneath a fruit bearing region of the tree. Typically, when viewed in plan, the catching zone has an outer upper perimeter that may be substantially circular and extends radially from the trunk. Alternatively, the catching zone when viewed in plan may be hexagonal or any other suitable shape.

The device typically includes a collecting zone located within the catching zone and when the device is mounted to a tree, the collecting zone is located at or near the lowermost part of the catching zone and the wall is configured such that fruit fall into the catching zone is guided towards the collecting zone.

In a particularly preferred form of the invention, the catching zone has a shape corresponding to a truncated inverted scalene cone or pyramid, and a scalene cone is particularly preferred. In this case, the upper perimeter of the catching means is formed by the open base of the cone or pyramid and the collection zone is located at or near the apex of the cone or pyramid. When the catching means is cone shaped, there will be essentially a single side wall. Where the catching zone is in the shape of a pyramid, the catching means will have at least three side walls. The tree trunk typically passes through the centre of the base at an angle to the axis of the cone or pyramid.

The catching means is mountable about the trunk of a tree. Typically the catching means when mounted has a substantially circular aperture through which the tree trunk passes. Preferably, the perimeter of the aperture contacts and/or locates snugly about the tree trunk. An advantage of this arrangement is that the catching means can provide a barrier to animals climbing the trunk to eat the fruit.

The aperture may have a flexible perimeter. For example, the aperture may be lined with substantially flexible tree contacting projections, which in use contact the tree. The flexibility of the projections allows the aperture to accommodate trunks of different diameters and trunks, which do not have a circular cross-section. Alternatively, the aperture may be lined with a layer of a resilient material such as a foam.

The catching means may be formed from a single piece of material, having a slot, or gap which allows the catching means to be placed about the trunk. Opposing side edges of the slot or gap may then be joined. Alternatively, the catching means may be formed from two or more panels, which may be joined around the tree. Preferably, the catching means can be stored in a flat storage position.

The device includes a collar configured to be positioned at a desired height around the trunk of a tree. The collar may be in the form of a chain, belt or strap and may be adjustable to suit a diameter of the trunk so that the collar can encircle the trunk. The device further includes one or more support members extending between the collar and the catching means. The support members may be rigid or flexible. When rigid support members are employed, it may be appreciated that the rigid support members may provide a degree of support to the catching means to resist against the catching means collapsing.

Substantially flexible members are preferred. A degree of flexibility allows the device to be buffeted by a wind. Where flexible support members are used it may be necessary to provide additional structural support to the device such that the upper perimeter remains open and does not distort under it's own weight during use. The additional structural support is suitably in the form of a support ring. The support ring may be integral with the catching means. For example, where the catching means is made from a thermoplastics material, the support may be provided by means of a thickened or otherwise reinforced ring of plastic.

Suitably the support structure further includes a support ring located on the catching means and the flexible support members extend between the collar and the support ring. In this embodiment, the support ring is serves to keep the shape of the catching means and further serves as a holding mechanism for the catching means.

According to a further broad form of the invention, there is provided a device for use with a fruit-bearing tree, the device being adapted to be mounted to a tree trunk and when mounted the device includes;

a catching means which in use has an upper perimeter and an aperture through which a tree trunk passes;

a support means having a collar attachable around the tree trunk, a support ring and at least two support members, wherein the support ring is mounted to the catching means at a location spaced inwardly from the upper perimeter, the collar is located above the catching means and the support members extend between the collar and the support ring.

The support ring is spaced from the upper periphery of the catching means. The present inventor has observed that an unexpected advantage of such an arrangement is that should fruit inadvertently strike the support ring or support member, the fruit will still fall into the catching means. Further, by joining the straps to a location on the net spaced from the perimeter, it is possible to mount the device higher on the tree than would normally be possible. This has advantages with regards to more efficient fruit collection and a more aesthetic appearance in that the device is less visible from the ground. This may be preferred where the device is mounted to a coconut tree in a tourist resort or the like where the combination of safety from falling coconuts and aesthetic appearance is desirable. Where the support ring is located on the periphery of the catching means there is a risk that falling fruit which strikes the support ring or the support members may be deflected and may not be caught by the device.

Preferably the support members are of adjustable length. This allows the position of the catching means relative to a tree trunk to be varied such that the device may be mounted to a tree trunk which is at an angle to the vertical whilst still being at an optimum position to catch falling fruit. It is known that trees such as coconut palms do not always grow in a strictly vertical manner.

The support members or ties may be in the form of radially extending strips of nylon webbing. The respective lengths of webbing may include buckles or other means for adjusting the length thereof. The device may also include a second aperture spaced from the first aperture. Where the device is in the form of a cone, the second aperture is typically located in the side wall thereof and the first aperture is centrally located an advantage of providing a second aperture is that by mounting the device around a tree trunk using the second aperture, a greater degree of lean in a tree trunk may be accommodated whilst allowing the upper perimeter of the device to remain substantially horizontal.

Where there are two apertures, the device may be provided with means for closing or sealing either aperture. Alternatively, the device is provided with means for forming the apertures. This may take the form of cut out portions or the like. Before mounting to a tree, an operator will decide as to which aperture to use and he or she can then cut out the desired aperture. An operator may adjust the diameter of the cut-out aperture to suit the size and/or shape of the tree to which the device is to be mounted.

The device may also be fixed or otherwise attached to the trunk at the lower end thereof. This may prevent the device from rotating about the tree trunk or being lifted upwards under high wind conditions.

The device may also include a collecting means beneath the catching means to collect fallen fruit. The collecting means may be in any suitable configuration, which may of course vary with the size, shape, and number of fruit, seeds or the like to be collected. The collecting means may be in the form of a basket or sock. The collecting means may have a closure moveable between a collecting position and a fruit releasing position. Alternatively, or in addition to, the collecting means may be removably attachable to the catching means. In this way, the collecting means may be disconnected from the catching means and emptied before replacing the collecting means.

In a particularly preferred form of the invention, the collecting means can be operated by an operator located below the catching means such that the collecting means can be lowered to enable easy collection whilst the catching means remains mounted to the tree. Alternatively, the whole device may be lowered to the ground to allow fruit to be collected. Suitable devices to enable rising and lowering of the catching means and/or collecting means includes a pulley mechanism or variations thereof.

BRIEF DESCRIPTION OF THE FIGURES

FIG. 13 is a schematic view of the device of FIG. 6 mounted to a tree,

FIG. 14 is a detail of the device as shown in FIG. 13.

FIG. 15 is a further detail of the device as shown in FIG. 13.

DETAILED DESCRIPTION OF THE FIGURES

Figure 1:
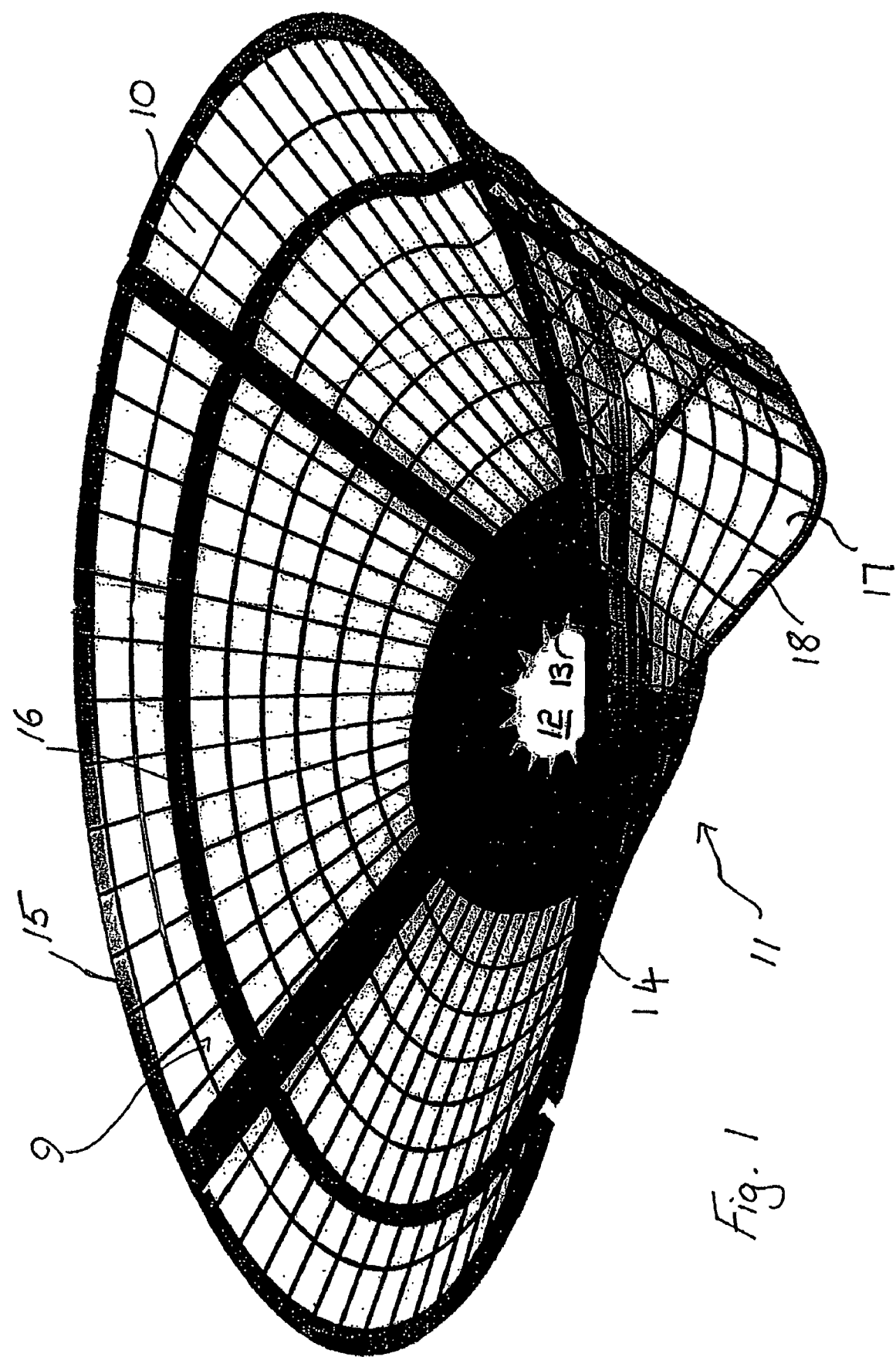
FIG. 1 is a perspective view of a preferred device of the present invention.

FIG. 1 shows a preferred device 11 of the present invention. The device 11 has a catching means in the form of a net 10 constructed from a thermoplastics material such as polyethylene, polypropylene or mixtures and blends thereof. The plastics material is sufficiently flexible such that the device may be manually formed to shape when being mounted to a tree, as will be described further below.

The net 10 has an aperture 12 through which a tree trunk may pass. A solid web portion 14 surrounds the aperture 12. In use, this web portion 14 can act as a barrier to animals climbing the tree trunk to eat the fruit.

The aperture 12 is lined with tree contacting fingers 13. These fingers 13 are at least partially flexible and can be pushed upwards or downwards by contact with a tree trunk. It can be seen therefore that the aperture 12 can be placed around trees having different diameters, the difference in diameter being accommodated by the movement of the fingers 13. The fingers 13 also enable the device 11 to be mounted to tree trunks, which are not strictly circular in cross-section. The fingers are spaced sufficiently close together such that fruit is unable to pass between the space therebetween.

Figure 2:
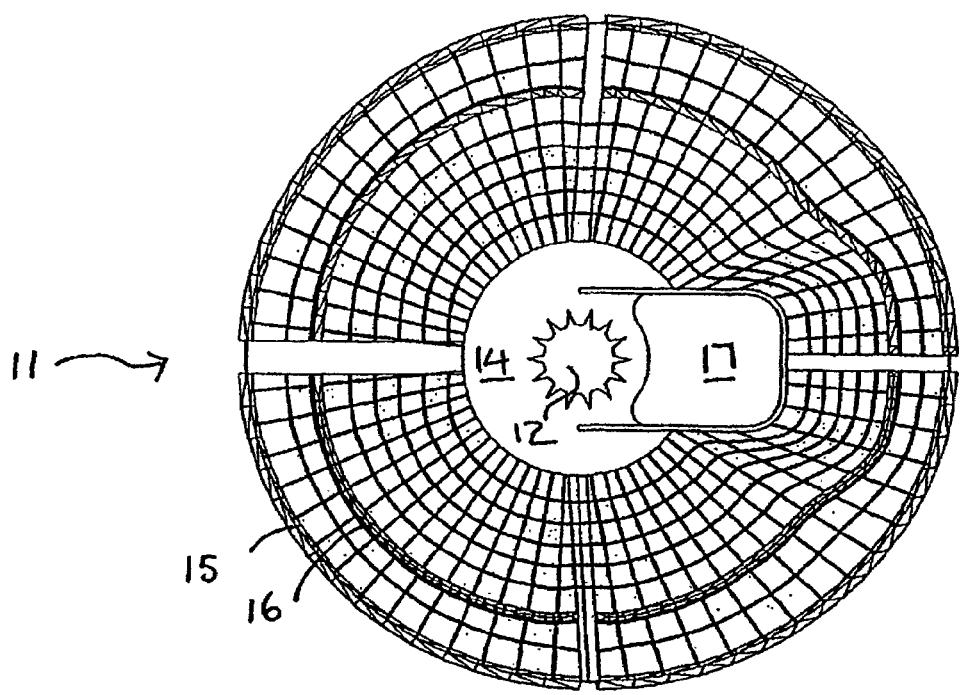
FIG. 2 is a plan view of the device of FIG. 1.
Figure 3:
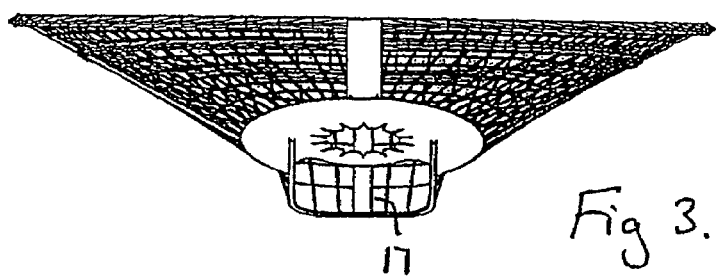
FIG. 3 is a front end view of the device of FIG. 1.
Figure 4:
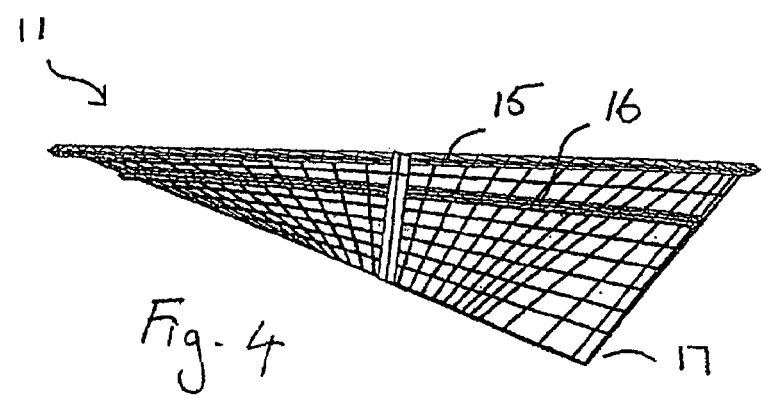
FIG. 4 is a side view of the device of FIG. 1.

The net 10 has an upper perimeter 15 which defines a catching zone 9. Any fruit falling within this zone 9 will fall into the net 10. FIGS. 2, 3 and 4 show plan, end and side views respectively of device 11. It can be seen in FIG. 2 that the catching zone 9 is circular in plan view and from FIG. 4 that the net 10 is substantially in the shape of a scalene cone. The aperture 12 is centrally located within the circle when viewed in plan.

The net 10 has a collecting zone 17 and when the device 11 is mounted to a tree, the collecting zone 17 is lowermost. This may be more clearly seen by reference to FIGS. 3 and 4. It can be seen that fruit falling within the catching zone 9 is guided by the curvature of the net wall towards the collecting zone 17. The collecting zone 17 has an aperture 18 through which collected fruit may pass. The collecting zone 17 may be provided with a closure for the aperture 18 such that if desired fallen fruit may collect in the collecting zone and be removed as desired by an operator.

Figure 5:
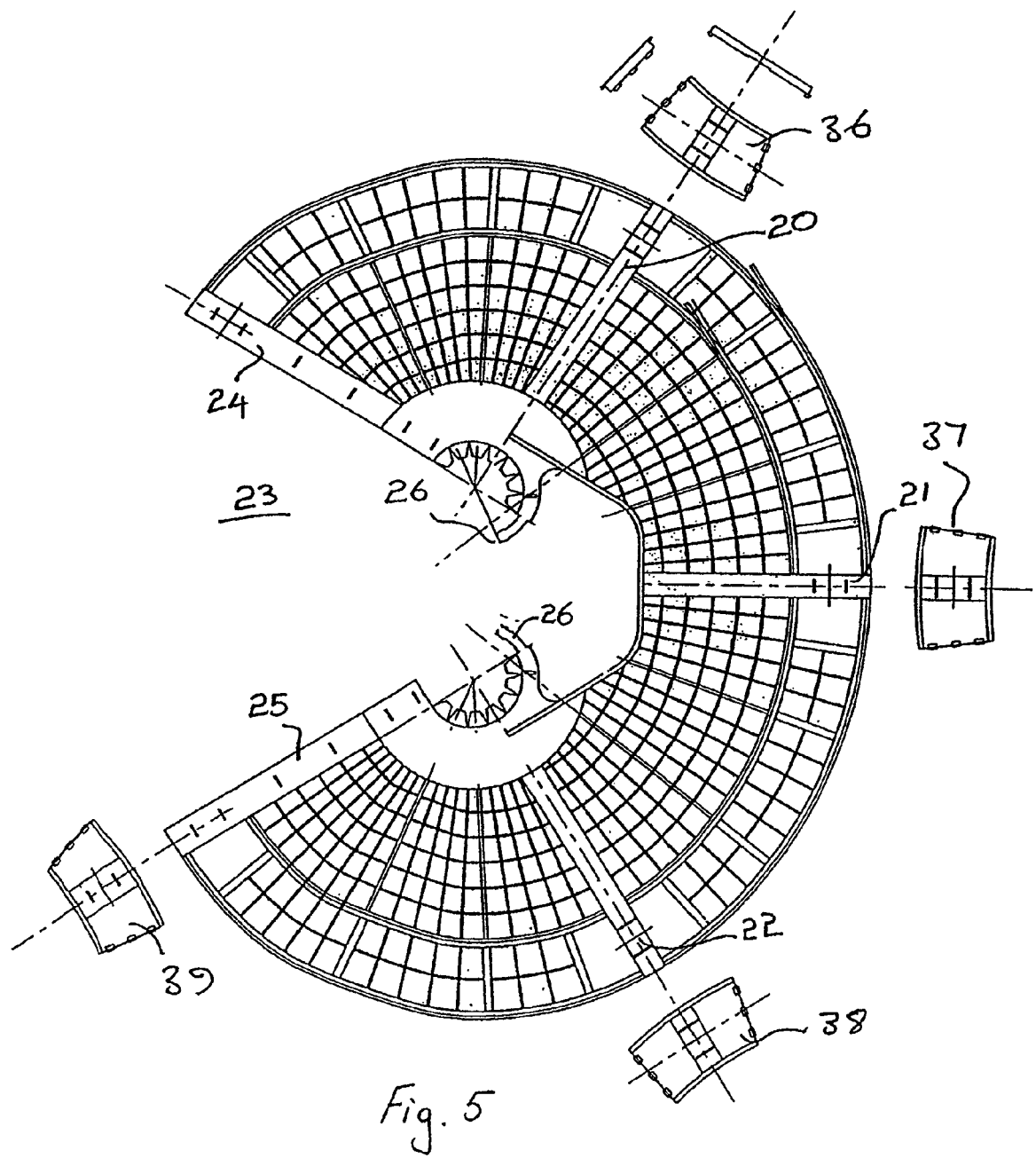
FIG. 5 is a plan view of the device of FIG. 1 before it is mounted to a tree.
Figure 6:
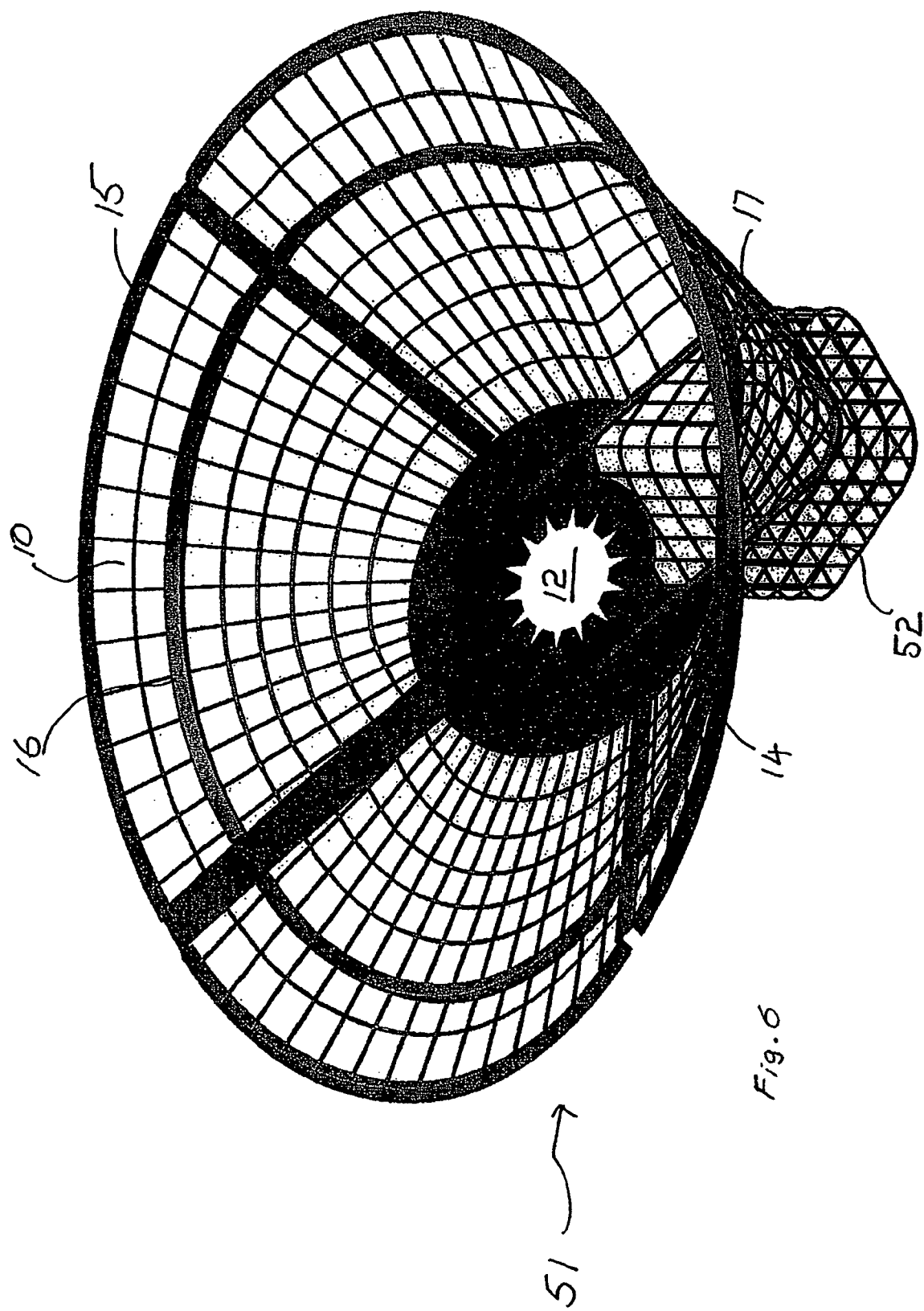
FIG. 6 is a perspective view of a further preferred device of the present invention.
Figure 7:
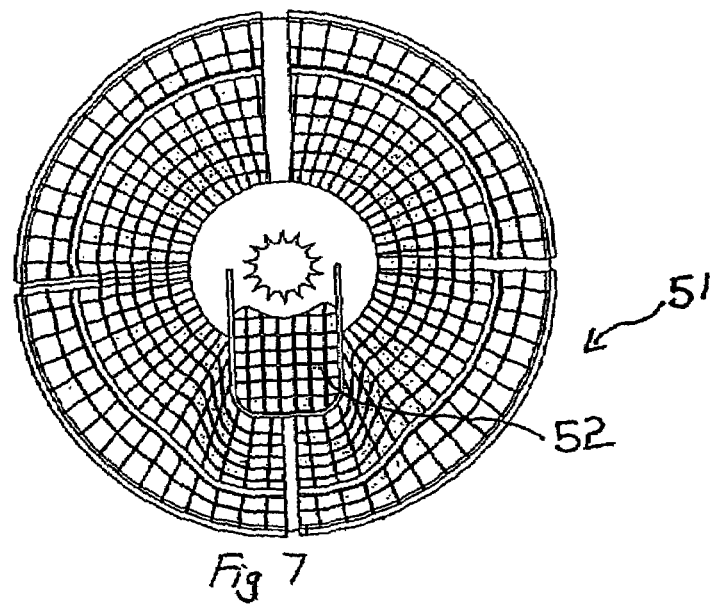
FIG. 7 is a plan view of the device of FIG. 6.
Figure 8:
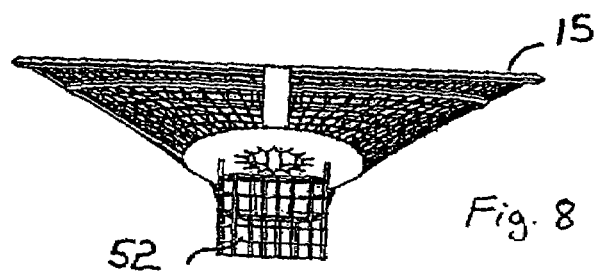
FIG. 8 is a front end view of the device of FIG. 6.
Figure 9:
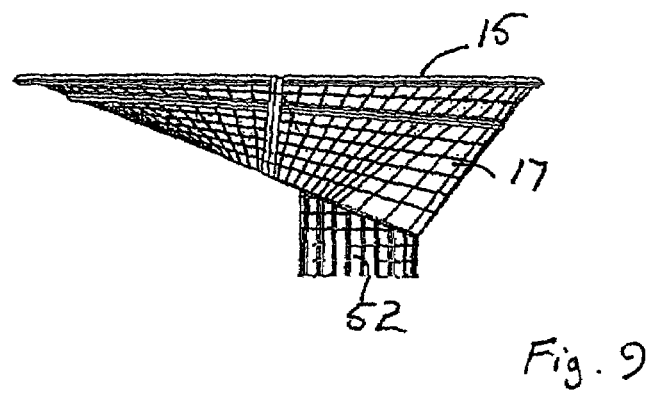
FIG. 9 is a side view of the device of FIG. 6.

FIG. 5 shows the device 11 before being mounted to a tree. The device 11 can essentially be laid out flat. In order to assist in transport and storage the device 11 is provided with fold lines 20, 21, 22 to allow the device to be folded and stored in a flat manner. In the unfolded and flat position, the device has an oval shape with a wedge 23 removed therefrom. Joining flaps 24, 25 extend along each side of the wedge 23. During mounting to a tree, the device 11 is placed about a tree trunk, flaps 24, 25 are brought together and joined. As the flaps 24, 25 are brought together the device takes a shape similar to that of a scalene cone as can be seen from FIG. 1. The device also includes inwardly facing tabs 26, which are also joined.

FIGS. 6 to 9 illustrate a further preferred device of the present invention. This device 51 is similar to that of FIG. 1 and the same reference numerals will be used to describe the same or similar features. Device 51 further includes a collecting basket 52 located below collecting zone 17. In use the basket 52 collects the fallen fruit. The basket is formed separately from the catching portion 54 of the net and can be lowered to allow a person located below the net to remove collected fruit therefrom.

Figure 10:
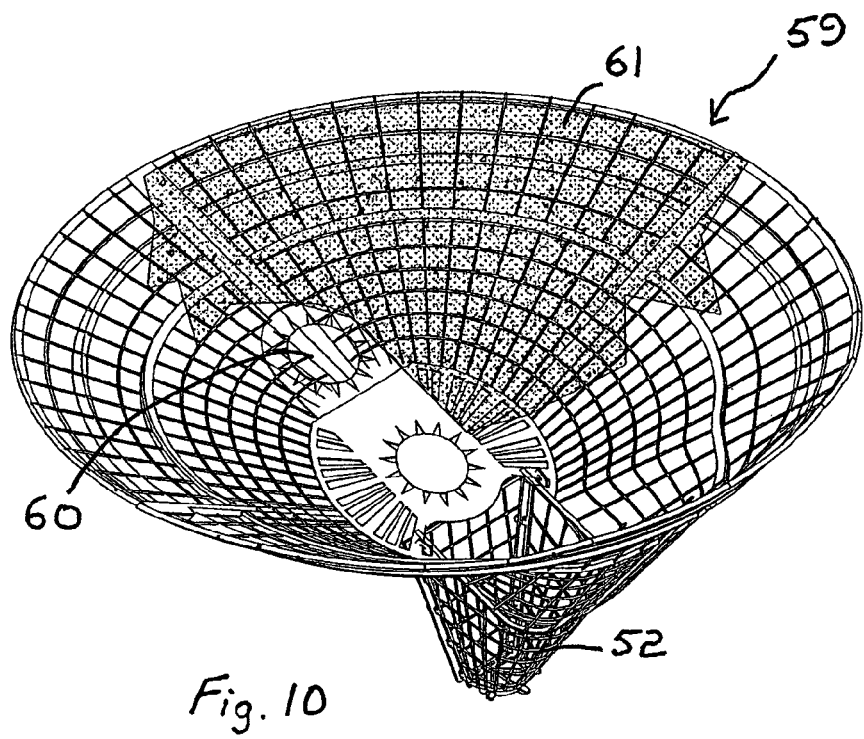
FIG. 10 is a perspective view of a further preferred device of the present invention.
Figure 11:
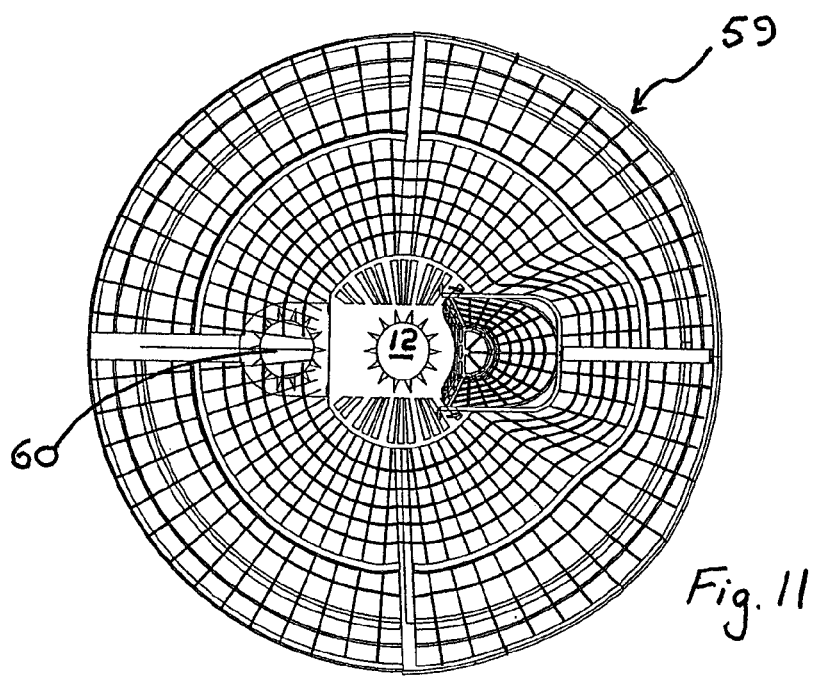
FIG. 11 is a plan view of the device of FIG. 10.

FIGS. 10 and 11 are perspective and plan views respectively of a further preferred device 59 of the present invention and the same reference numerals will be used to describe the same features. The device 59 is essentially the same as that shown in FIG. 6 except for the provision of a cut-out portion 60. The cut-out portion 60 may be removed to provide a second aperture through which a tree trunk may pass. The purpose of the second aperture is to enable the device 59 to be mounted to severely sloping coconut trees. If the second aperture is cut-out, then a plate or other closure device may be placed upon over first aperture 12.

The device 59 also includes a net lining 61 formed from a mesh material having gaps finer than the net 10. This enables the net 10 to be used to catch fruits smaller than the spaces in the net 10.

Figure 12:
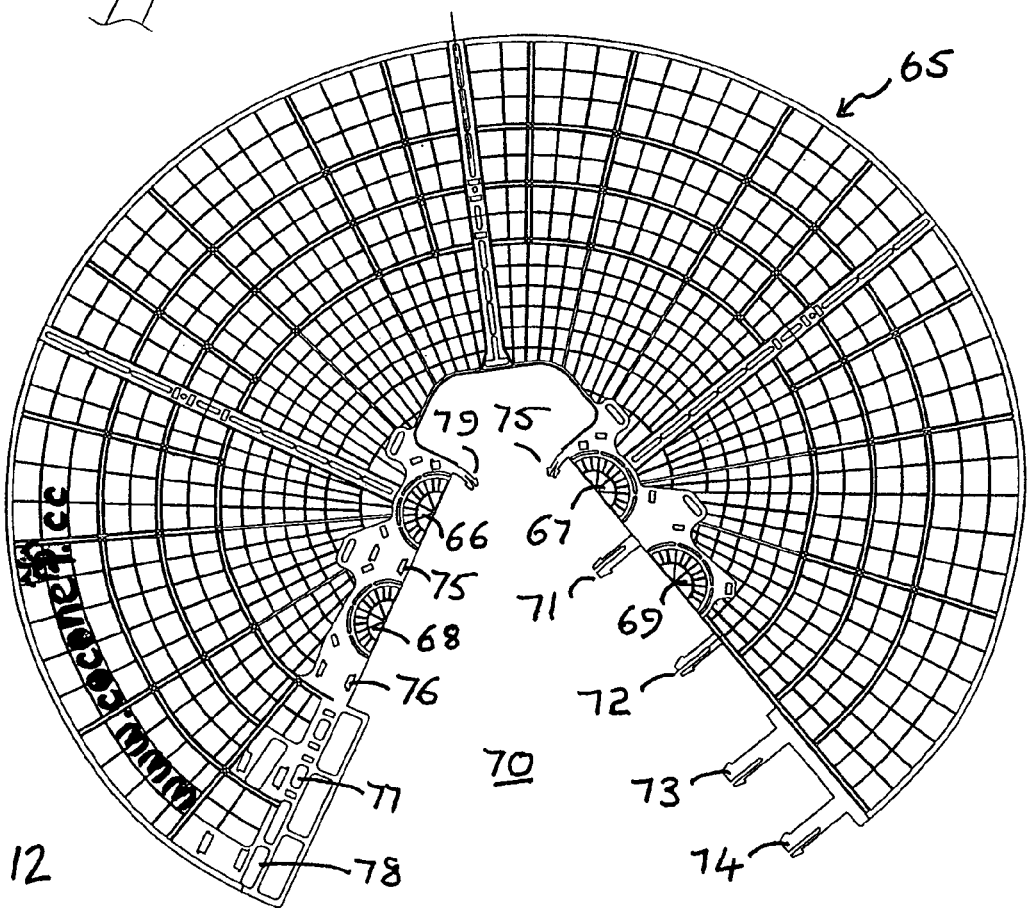
FIG. 12 is a plan view of a further preferred device of the invention in a flat storage position.

FIG. 12 shows a further preferred device 65 of the present invention laid out in a flat storage position. This device 65 is similar to that shown in FIGS. 10 and 11 in that two apertures are provided for by means of two pairs of semi-circular cut-out portions 66, 67 and 68, 69. The device 65 is oval shaped with a wedge portion 70 removed therefrom. Joining tabs 71, 72, 73, 74, 75 extend from one side of wedge 70. When the device 65 is mounted about a tree trunk and, the side edges of the wedge are drawn together such that joining tabs 71, 72, 73, 74, locate in slots 75, 76, 77, 78 on the facing side of the wedge. Tab 75 joins to a complimentary tab 79.

FIG. 13 shows schematically the device 59 of FIG. 10 mounted to a tree trunk 30. The tree trunk 30 passes through the first aperture which is located substantially centrally of the net 10. The aperture is secured to the tree trunk 30 by means of two lengths of chain (not shown). The chains serve to prevent the device 59 from rotating about the tree trunk 30. They also prevent the device 59 from being lifted upwards in strong winds.

Figure 16:
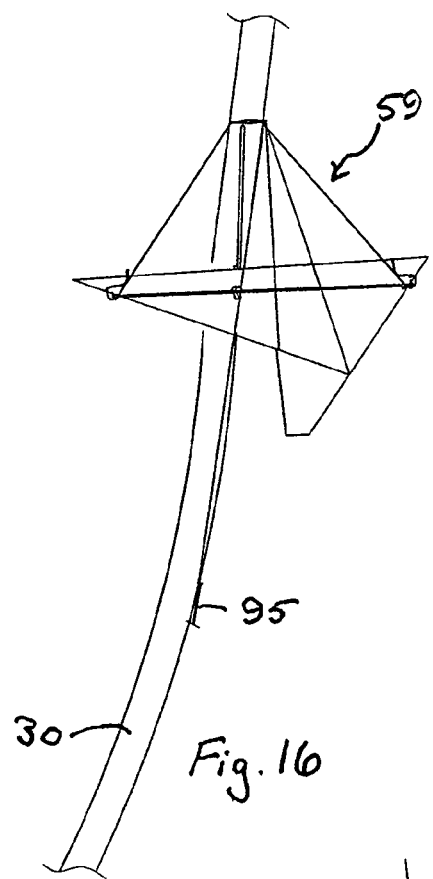
FIG. 16 is a schematic view of the device of FIG. 6 mounted to a tree having an angled trunk.

The device 59 includes a chain 31 mounted to the tree trunk above the net 10. The chain 31 is double wrapped around the tree and is clipped together by a bow shackle 94 (shown in FIG. 15). Four flexible support members 32, 33, 34, (the fourth not being visible) extend from the chain 31. The weight of the net and support members 32, 33, 34 tighten chain 31 to fasten it and hold it "firm" about the tree trunk. The support members 32, 33, 34 are typically manufactured from nylon webbing. The support members 32, 33, 34 are of adjustable length, which allows the angle of the device 65 to be varied with respect to the tree trunk. Such variation may be desired when the device 65 is to be mounted to a tree trunk, which is not vertical. The variation allows the upper perimeter 15 of the device 59 which defines the outer limit of the catching area to remain substantially parallel to the ground regardless of the angle of the tree trunk. This is shown in FIG. 16. Still further, in FIG. 16, the trunk 30 of the tree passes through the second aperture which is located in the side wall of net 10. It may be seen that the manner in which the device is supported allows the upper perimeter 15 of the net 10 to remain substantially horizontal. The present inventor is unaware of any other fruit catching device which has this capability.

The device 59 has a fibreglass ring 80 or hoop located around the circumference thereof and spaced from the outer perimeter 15. The net 10 has a series of keepers (not shown) through which the hoop 80 is threaded. A detail of how the hoop 80 is attached to the net is shown in FIG. 15. The hoop 80 is fixed to the net by means of a number of ferules 62 which are made of stainless steel and have a ring 63 through which hoop 60 passes. The ferrule 62 has a pair of retaining legs 64 which are embedded in the net 10.

FIG. 14 also shows how that the straps 32, 33, 34, are attached to the net 10 by means of hoop 80. A strap 32 passes though a slot 84 in the net, 10 passes around hoop 80 and back through a second slot 85. The terminal end 86 of the strap 32 is joined to the main body of the strap by a buckle or other linking means (not shown).

The hoop 80 is formed from fibreglass such that it has a degree of bias towards the straightened position. This allows the hoop 80 to fit securely within the keepers which contributes to overall stability of the net 10. Still further the fibreglass has sufficient flexibility to allow the hoop 80 to be threaded through the keepers after the net 10 has been folded into shape. However, the hoop 80 has sufficient rigidity to hold its shape when suspended from the straps 32, 33, 34.

FIG. 15 shows a further detail of FIG. 13. Three ropes 91, 92, 93 are attached at one end to three lugs (not shown) on basket 52. The three ropes loop through bow shackle 94 and then extend downwards as shown in FIGS. 13 and 16. The other ends of each rope are attached to a cleat 95 formed from two screws embedded into the trunk 30 of the tree. The cleat 95 may be positioned at a height at which an operator can operate from the ground. Alternatively, the cleat 95 may be located at a height which requires an operator to be located on a ladder or the like. This may be desirable in instances where there is a risk of vandalism or unauthorized operation of the device. It may be seen that the bow shackle serves to both join the chain 31 and the basis for the pulley arrangement by which the basket is lowered and raised. It can be seen that the device of the present invention can act as a safety net to catch coconuts and other heavy fruits before they hit the ground. The device can be mounted to tree trunks of varying diameter and can also be used effectively on tree trunks that are not strictly vertical. This is a limitation which the present inventor has identified with many prior art fruit collecting devices. The catching means of the device has no moving parts, which require maintenance or which can be damaged by falling fruit. The catching means of the device of the present invention may be manufactured in one piece and stored and transported in an essentially flat position. The device may be installed quickly and efficiently. The device is manufactured from a durable material which may be exposed to extended periods of inclement weather. In high wind situations it will be appreciated that the net provides minimal resistance as compared to prior art solid catching aprons and the like. The net also minimizes or avoids moisture build up within the device after periods of rain. In some prior art devices, water can be retained within the catching means and/or absorbed into the fabric of the catching material. This can lead to mould growth and degradation of the catching material.

It will be appreciated that minor modifications may be made to the invention as described and claimed herein without departing from the spirit and scope thereof.

The invention claimed is:

1. A device for use with a fruit-bearing tree, the device being adapted to be mounted to and suspended from a tree trunk and when mounted the device includes:
   a catching means which in use has an upper outer perimeter and an aperture through which a tree trunk passes;
   a collar attachable around the tree trunk at a location above the catching means;
   a support ring mounted to the catching means at a location spaced inwardly from and adjacent to the upper outer perimeter; and
   support members extending between the collar and the support ring to suspend the catching means on the tree and provide the sole support for the outer perimeter thereof.

2. The device of claim 1, wherein the catching means includes keepers through which the support ring passes and the support ring is biased towards a straightened conformation such that the support ring exerts an outwards force against the keepers.

3. The device of claim 1, wherein the collar is a chain.

4. The device of claim 1, wherein the catching means has a shape corresponding to a truncated inverted scalene cone.

5. The device of claim 4 which includes a fruit collecting means located at the lowermost section of the cone.

6. The device of claim 5 which includes means for lowering and raising the fruit collecting means to enable the fruit to be collected therefrom whilst the catching means remains mounted to the tree.

7. The device of claim 5 wherein the fruit collecting means is supported by the collar.

8. The device of claim 1 wherein the catching means is in the form of a net.

9. The device of claim 8, wherein the net is formed from a thermoplastics material.

10. The device of claim 9, which includes a net liner for catching relatively small items of fruit.

11. The device of claim 1, which is moveable from a flat storage position to an in use position.

12. The device of claim 11, which, when in the flat position prior to use, the device has at least one cut-out section for forming the first aperture and at least one further cut-out section for forming a second aperture.

* * * * *